US012646660B2

(12) United States Patent
  Adams

(10) Patent No.: US 12,646,660 B2
(45) Date of Patent: Jun. 2, 2026

(54) ELECTROLYTE ADDITIVES FOR ZINC METAL ELECTRODES

(71) Applicant: Salient Energy Inc., Dartmouth (CA)

(72) Inventor: Brian D Adams, Mitchell (CA)

(73) Assignee: Salient Energy Inc., Dartmouth (CA)

( * ) Notice: Subject to any disclaimer, the term of this patent is extended or adjusted under 35 U.S.C. 154(b) by 0 days.

(21) Appl. No.: 16/500,223

(22) PCT Filed: May 1, 2018

(86) PCT No.: PCT/CA2018/050510
  § 371 (c)(1),
  (2) Date: Oct. 2, 2019

(87) PCT Pub. No.: WO2018/201239
  PCT Pub. Date: Nov. 8, 2018

(65) Prior Publication Data
  US 2020/0176198 A1      Jun. 4, 2020

Related U.S. Application Data

(60) Provisional application No. 62/492,446, filed on May 1, 2017.

(51) Int. Cl.
  H01G 11/64        (2013.01)
  H01G 11/28        (2013.01)
      (Continued)

(52) U.S. Cl.
  CPC ............. H01G 11/64 (2013.01); H01G 11/28 (2013.01); H01G 11/62 (2013.01); H01M 4/42 (2013.01);
      (Continued)

(58) Field of Classification Search
  CPC ...... H01M 4/42; H01M 4/662; H01M 12/085; H01M 2004/027; H01M 10/36;
      (Continued)

(56) References Cited

U.S. PATENT DOCUMENTS

| 3,944,430 | A |   | 3/1976 | Lee |   |
|---|---|---|---|---|---|
| 4,268,589 | A | * | 5/1981 | Tamminen | ............ H01M 10/24 |
|  |  |  |  |  | 429/207 |

(Continued)

FOREIGN PATENT DOCUMENTS

| CA | 2962296 | 12/2016 |
|---|---|---|
| CN | 102769151 A | 11/2012 |

(Continued)

OTHER PUBLICATIONS

Alfaruqi et al (Electrochemical Zinc Intercalation in Lithium Vanadium Oxide: A High-Capacity Zinc-Ion Battery Cathode. Chem. Mater. 2017, 20, 1684-1694).*

(Continued)

*Primary Examiner* — Stephen J Yanchuk
(74) *Attorney, Agent, or Firm* — Own Innovation; Daniel Biggs; James W. Hinton

(57)        ABSTRACT

Zinc metal negative electrodes and aqueous electrolytes can be used in a rechargeable battery. The electrolyte can include zinc sulfate dissolved in water with a pH in the range of 0-7, and at least one additive for increasing ionic conductivity of the electrolyte, and/or buffering the pH of the electrolyte, and/or controlling morphology of a stripped/plated surface of the negative electrode. The electrolyte can decrease the likelihood of internal short circuits caused by volumetric expansion of the negative electrode and morphology changes after repeated cycling and penetration of zinc metal through a separator to a positive electrode.

15 Claims, 10 Drawing Sheets

(51) Int. Cl.

| | |
|---|---|
| *H01G 11/62* | (2013.01) |
| *H01M 4/42* | (2006.01) |
| *H01M 4/66* | (2006.01) |
| *H01M 10/36* | (2010.01) |
| *H01M 12/08* | (2006.01) |
| *H01M 4/02* | (2006.01) |

(52) U.S. Cl.
CPC ......... *H01M 4/662* (2013.01); *H01M 10/365* (2013.01); *H01M 12/085* (2013.01); *H01M 2004/027* (2013.01)

(58) Field of Classification Search
CPC .... H01M 10/425; H01M 10/38; H01M 4/485; H01M 4/48; H01M 4/0438; H01M 4/14; H01G 11/64; H01G 11/62
See application file for complete search history.

(56) References Cited

U.S. PATENT DOCUMENTS

| | | | | |
|---|---|---|---|---|
| 9,276,292 | B1* | 3/2016 | MacKenzie | ............. H01M 4/62 |
| 2006/0063065 | A1* | 3/2006 | Clarke | .................... H01M 8/08 429/105 |
| 2009/0090636 | A1* | 4/2009 | Feng | ........................ C25D 5/34 205/300 |
| 2015/0155559 | A1* | 6/2015 | Zimmerman | ......... H01M 4/625 429/224 |
| 2016/0111755 | A1* | 4/2016 | Liu | ........................ H01M 10/38 429/152 |
| 2017/0222272 | A1* | 8/2017 | Takami | ............... H01M 4/5825 |
| 2018/0316064 | A1* | 11/2018 | Wei | ........................ H01M 10/28 |

FOREIGN PATENT DOCUMENTS

| | | | | | |
|---|---|---|---|---|---|
| CN | 103326055 | A | 9/2013 | | |
| CN | 103904352 | A | 7/2014 | | |
| CN | 105336993 | A | 2/2016 | | |
| EP | 0964467 | A2 | 12/1999 | | |
| EP | 2717377 | A1 | 4/2014 | | |
| EP | 2996182 | A1 | 3/2016 | | |
| JP | 2000082452 | A | 3/2000 | | |
| JP | 2015185259 | A | 10/2015 | | |
| JP | 2016146263 | A | 8/2016 | | |
| WO | WO-2014037851 | A2 * | 3/2014 | .......... | B60L 11/1851 |
| WO | 2017070340 | A1 | 4/2017 | | |

OTHER PUBLICATIONS

WO 2014-037851 English Translation.*
Canadian Intellectual Property Office as International Searching Authority, International Search Report and Written Opinion for PCT/CA2018/050510, Jul. 10, 2018.
European Patent Office, Extended European Search Report for EP Patent App. No. 18794085.3, Mar. 1, 2021.
China National Intellectual Property Administration, Office Action for Chinese Patent App. No. 201880028817.6, Mar. 23, 2022.

* cited by examiner

(a)

(b)

(c)

ELECTROLYTE ADDITIVES FOR ZINC METAL ELECTRODES

CROSS-REFERENCE TO RELATED APPLICATION

This application claims priority to U.S. Provisional Application No. 62/492,446 filed on May 1, 2017, the entire contents of which are hereby incorporated herein by reference.

FIELD

The present disclosure relates generally to electrochemistry, and, more specifically, zinc metal plating and stripping.

INTRODUCTION

The following paragraphs are not an admission that anything discussed in them is prior art or part of the knowledge of persons skilled in the art.

Metallic zinc negative electrodes are used in many primary and secondary aqueous battery types. Zinc has a high abundance and large production which makes it inexpensive; it is non-toxic; has a low redox potential (−0.76 V vs. standard hydrogen electrode (SHE)) compared to other negative electrode materials used in aqueous batteries; and is stable in water due to a high overpotential for hydrogen evolution.

One drawback and challenge for secondary batteries using zinc negative electrodes is the formation of dendritic or mossy deposits which can build up during repeated cycling and cause premature cell failure by internal short circuits.

The deposition (plating) of zinc metal is an important industrial process. Zinc plating is used for corrosion protection and both aqueous and non-aqueous battery electrolytes (or plating baths) have been applied to this process, yet aqueous electrolytes can be more attractive due for practical and economic reasons. The smooth deposition of zinc is important for uniform coverage of metal substrates for good corrosion protection. Uniform deposition can be controlled not only by optimizing the plating bath composition, but also by controlling other parameters such as temperature, current density, and mechanical agitation (flow or stirring) of the bath.

The reversible zinc plating/stripping occurs in rechargeable batteries using zinc metal negative electrodes. Compared to the zinc plating process where only deposition occurs, volumetric changes during the plating/stripping cycling of zinc metal battery electrodes can lead to problems including internal short circuiting by penetration of zinc metal through the separator and contact with the positive electrode. In addition to the necessity to consider both plating and stripping mechanisms in a battery, during practical cycling, parameters such as current density and temperature cannot be controlled as easily and stirring the electrolyte is typically impossible. On the other hand, lessons can be learned from traditional zinc plating bath compositions to optimize for good cycling of the zinc electrode in rechargeable batteries.

Acidic sulfate and chloride plating baths have been historically used with the addition of so-called brighteners to provide a shiny finish of zinc metal on other metals. Chloride baths have the advantage of higher ionic conductivities and better dissolution of the zinc anode compared to their sulfate counterparts. However, the chloride anion should be avoided in batteries because it is quite corrosive and can dissolve other components of the battery during operation as well as lead to the risk of chlorine evolution at the positive electrode. For these reasons, the sulfate anion is preferred for acidic aqueous rechargeable zinc metal batteries. Zinc sulfate has the advantages of being relatively inexpensive, non-corrosive, and has a wide stability voltage window.

Many traditional aqueous batteries using zinc metal electrodes, such as alkaline batteries and zinc-carbon batteries, use alkaline electrolytes. Commonly, in alkaline electrolytes, a dendritic morphology of zinc deposits is observed. Dendrites are particularly problematic because of the high surface area and ease of penetration through separators. In addition to dendrite growth, the low coulombic efficiency (CE) of zinc metal plating/stripping is also a major challenge. This has inhibited these primary (non-rechargeable) battery types from being recharged. Many new battery chemistries including zinc-air batteries, zinc-ion batteries, zinc hybrid supercapacitors, zinc-bromide batteries, zinc-iodide batteries, zinc-iron redox flow batteries, and zinc-cerium redox flow batteries can use acidic electrolytes rather than alkaline electrolytes.

SUMMARY

The following is intended to introduce the reader to the detailed description that follows and not to define or limit the claimed subject matter.

In an aspect of the present disclosure, an apparatus for a rechargeable battery can include: a negative electrode including zinc; and an electrolyte for transferring ions between the negative electrode and a positive electrode, the electrolyte including zinc sulfate dissolved in water with a pH in the range of 0-7, and at least one additive. The at least one additive can be selected to at least one of (i) increase ionic conductivity of the electrolyte, (ii) buffer the pH of the electrolyte, and (iii) control morphology of a stripped/plated surface of the negative electrode.

The at least one additive can include at least one salt that increases the ionic conductivity of the electrolyte. The at least one salt can include at least one of (i) a salt with zinc cations, (ii) a salt with sulfate anions, (iii) a salt with alkali metal, alkaline earth metal, magnesium, aluminum, tetra alkyl ammonium or ammonium cations, and (iv) a salt with perchlorate, chloride, nitrate, phosphate, acetate, or citrate anions. The at least one salt can be present in the electrolyte in a range from about 0.05 M to about 6 M.

The at least one additive can include at least one buffering agent that buffers the pH of the electrolyte. The at least one buffering agent can include at least one of borates, acetates, phosphates, citrates, phthalates, salicylic acid, and benzoic acid. The at least one buffering agent can be present in the electrolyte in a range from about 0.005 M to about 6 M.

The at least one additive can include at least one control additive that smooths the stripped/plated surface of the negative electrode. The at least one control additive can include at least one chemical functional group of alkyl, alkenyl, alkynyl, phenyl, amine, hydroxyl, ether, thiol, aldehyde, ketone, ester, carboxyl, amide, borate, carbonate, siloxyl, halo, imine, and imide. The at least one control additive can be present in the electrolyte in a range from about 10 ppm to about 50 percent.

The zinc sulfate can be dissolved so that Zn2+ ions are present in the electrolyte in a range from about 0.05 M to about 4 M. The pH of the electrolyte can be between about 4 and about 6.

The negative electrode can be formed substantially of zinc metal. The negative electrode can be formed substantially of a zinc alloy. The negative electrode can include a current collector, and the current collector can include an active surface that is formed substantially of a layer of zinc. The layer of zinc can include powdered zinc metal. The layer of zinc can include a sheet of zinc metal. The current collector can be formed substantially of a material selected from the group consisting of carbon, boron, lead, vanadium, chromium, manganese, iron, cobalt, nickel, cadmium, tungsten, bismuth, tin, indium, antimony, copper, titanium, zinc metal, and any combination thereof.

The apparatus can be used in the operation of an aqueous rechargeable battery, in which the electrolyte is static and contained between the positive and negative electrodes, or is flowed therebetween. The battery can take the form of a zinc-air battery, a zinc-ion battery, a zinc hybrid supercapacitor, a zinc-bromide battery, a zinc-iodide battery, a zinc-iron redox flow battery, or a zinc-cerium redox flow battery.

In an aspect of the present disclosure, a method can include: providing a negative electrode including zinc; dissolving zinc sulfate in water to provide an electrolyte with a pH in the range of 0-7 for transferring ions between the negative electrode and a positive electrode; and adding at least one additive to the electrolyte. The at least one additive can be selected to at least one of (i) increase ionic conductivity of the electrolyte, (ii) buffer the pH of the electrolyte, and (iii) control morphology of a stripped/plated surface of the negative electrode.

At least one salt can be added to increase the ionic conductivity of the electrolyte, the at least one salt including at least one of (i) a salt with zinc cations, (ii) a salt with sulfate anions, (iii) a salt with alkali metal, alkaline earth metal, magnesium, aluminum, tetra alkyl ammonium or ammonium cations, and (iv) a salt with perchlorate, chloride, nitrate, phosphate, acetate, or citrate anions. The at least one salt can be added to the electrolyte in a range from about 0.05 M to about 6 M.

At least one buffering agent can be added to buffer the pH of the electrolyte, the at least one buffering agent including at least one of borates, acetates, phosphates, citrates, phthalates, salicylic acid, and benzoic acid. The at least one buffering agent can be added to the electrolyte in a range from about 0.005 M to about 6 M.

At least one control additive can be added to smooth the stripped/plated surface of the negative electrode, the at least one control additive including at least one chemical functional group of alkyl, alkenyl, alkynyl, phenyl, amine, hydroxyl, ether, thiol, aldehyde, ketone, ester, carboxyl, amide, borate, carbonate, siloxyl, halo, imine, and imide. The at least one control additive can be added to the electrolyte in a range from about 10 ppm to about 50 percent.

The zinc sulfate can be dissolved so that $Zn2+$ ions are present in the electrolyte in a range from about 0.05 M to about 4 M. The pH of the electrolyte can be maintained between about 4 and about 6.

The negative electrode and the electrolyte can be operated in an aqueous rechargeable battery, in which the electrolyte is static and contained between the positive and negative electrodes, or is flowed therebetween. The battery can take the form of a zinc-air battery, a zinc-ion battery, a zinc hybrid supercapacitor, a zinc-bromide battery, a zinc-iodide battery, a zinc-iron redox flow battery, or a zinc-cerium redox flow battery.

In an aspect of the present disclosure, an aqueous electrolyte for use in a rechargeable battery can include zinc sulfate dissolved in water with a pH in the range of 0-7, and at least one additive. The at least one additive can be selected to at least one of (i) increase ionic conductivity of the electrolyte, (ii) buffer the pH of the electrolyte, and (iii) control morphology of a stripped/plated surface of a negative electrode of the rechargeable battery.

The at least one additive can include at least one salt that increases the ionic conductivity of the electrolyte, the at least one salt including at least one of (i) a salt with zinc cations, (ii) a salt with sulfate anions, (iii) a salt with alkali metal, alkaline earth metal, magnesium, aluminum, tetra alkyl ammonium or ammonium cations, and (iv) a salt with perchlorate, chloride, nitrate, phosphate, acetate, or citrate anions. The at least one salt can be present in the electrolyte in a range from about 0.05 M to about 6 M.

The at least one additive can include at least one buffering agent that buffers the pH of the electrolyte, the at least one buffering agent including at least one of borates, acetates, phosphates, citrates, phthalates, salicylic acid, and benzoic acid. The at least one buffering agent can be present in the electrolyte in a range from about 0.005 M to about 6 M.

The at least one additive can include at least one control additive to smooth the stripped/plated surface of the negative electrode, the at least one control additive comprising at least one chemical functional group of alkyl, alkenyl, alkynyl, phenyl, amine, hydroxyl, ether, thiol, aldehyde, ketone, ester, carboxyl, amide, borate, carbonate, siloxyl, halo, imine, and imide. The at least one control additive can be present in the electrolyte in a range from about 10 ppm to about 50 percent.

The zinc sulfate can be dissolved so that $Zn2+$ ions are present in the electrolyte in a range from about 0.05 M to about 4 M. The pH of the electrolyte can be between about 4 and about 6.

Other aspects and features of the teachings disclosed herein will become apparent, to those ordinarily skilled in the art, upon review of the following description of the specific examples of the present disclosure.

BRIEF DESCRIPTION OF THE DRAWINGS

The drawings included herewith are for illustrating various examples of apparatuses and methods of the present disclosure and are not intended to limit the scope of what is taught in any way. In the drawings.

DETAILED DESCRIPTION

Various apparatuses or methods will be described below to provide an example of an embodiment of each claimed invention. No embodiment described below limits any claimed invention and any claimed invention may cover apparatuses and methods that differ from those described below. The claimed inventions are not limited to apparatuses and methods having all of the features of any one apparatus or method described below, or to features common to multiple or all of the apparatuses or methods described below. It is possible that an apparatus or method described below is not an embodiment of any claimed invention. Any invention disclosed in an apparatus or method described below that is not claimed in this document may be the subject matter of another protective instrument, for example, a continuing patent application, and the applicant(s), inventor(s) and/or owner(s) do not intend to abandon, disclaim or dedicate to the public any such invention by its disclosure in this document.

The present disclosure relates generally to improving the cycle life of batteries having zinc metal negative electrodes. In particular, it has been determined that additives can be used to control the zinc morphology to extend the cycle life of secondary aqueous batteries by decreasing the likelihood of internal short circuits.

Figure 1:
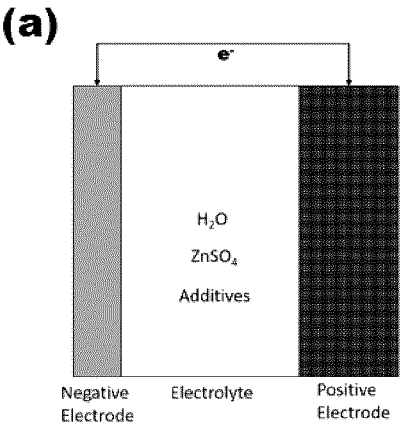
FIG. 1 shows schematic diagrams of example electrochemical systems using a zinc metal negative electrode and an electrolyte: (a) a static system where the electrolyte is contained between the negative and positive electrodes; (b) a flow system where separate electrolytes are used for the negative and positive electrodes and the electrolytes are stored in external tanks; and (c) possible compositions of the negative electrode.
Figure 1:
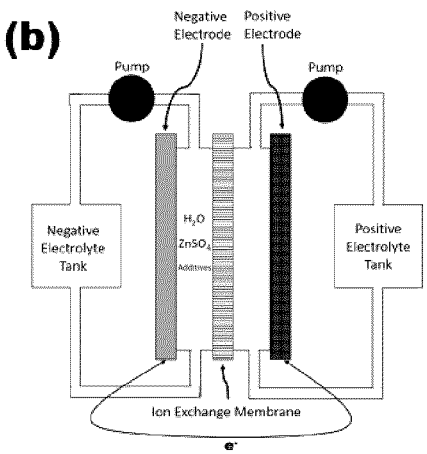
Figure 1:
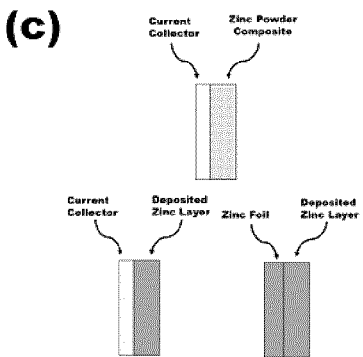

FIG. 1*a* displays a battery system in which reversible zinc plating and stripping occur at the negative electrode and any electrochemical redox reaction occurs at the positive electrode at a potential higher than that of zinc metal (i.e. −0.76 V vs. standard hydrogen electrode). A flow type battery is shown in FIG. 1*b* where the electrolyte for zinc plating/stripping is flowed across the negative electrode and a separate electrolyte is used for the positive electrode. Possible configurations of the negative electrode are shown in FIG. 1*c*. Here, the zinc metal layer is deposited from Zn$^{2+}$ ions in the electrolyte onto a current collector during reduction. During oxidation, the zinc metal layer is stripped from the current collector and Zn$^{2+}$ cations are dissolved the electrolyte. The reversible reaction is: Zn$^{2+}$+2e$^-$↔Zn. The negative electrode current collector can be formed of any one or combination of carbon, boron, lead, vanadium, chromium, manganese, iron, cobalt, nickel, cadmium, tungsten, bismuth, tin, indium, antimony, copper, titanium, and zinc metal. It can in any shape or form, including sheet, plate, foil, conductive paper, mesh, rod, or wire, and can even be zinc metal itself. A zinc layer can also be present in the initial state of an active surface of the negative electrode to be stripped during the first cycle. This layer can be deposited onto a current collector as pure zinc metal by chemical, electrochemical, or vapor deposition methods or could be a composite of zinc metal powder with a binder and/or an additional conductive additive.

Figure 2:
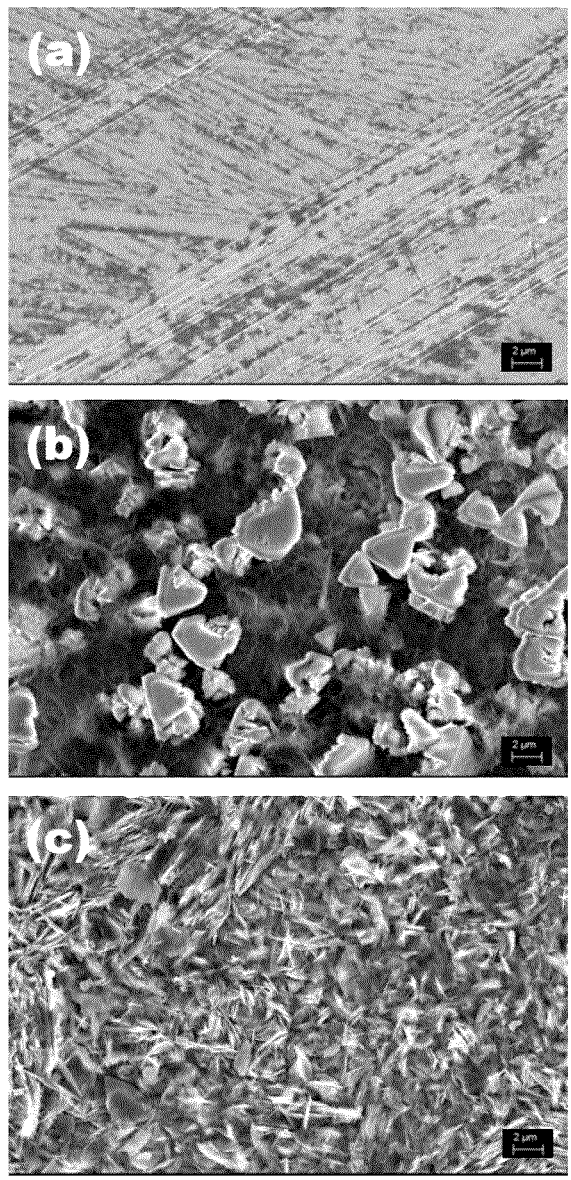
FIG. 2 shows scanning electron microscope (SEM) images of zinc electrode surfaces, and in which: (a) shows a pristine foil; (b) shows a surface of the foil after stripping at 1 $mA/cm^2$ to a capacity of 1 $mAh/cm^2$; and (c) shows the surface after plating at 1 $mA/cm^2$ to a capacity of 1 $mAh/cm^2$.

FIG. 2 displays the SEM images of zinc electrode surfaces. The pristine zinc foil surface is displayed in (a), the surfaces after one electrodissolution (stripping) in (b), and one electrodeposition (plating) in (c). The stripped and plated surfaces were controlled at a current density of 1 mA/cm$^2$ to a capacity of 1 mAh/cm$^2$. The stripped electrode surface appears non-uniform with several patches of undissolved zinc (FIG. 2*b*). Selective pitting can occur during the stripping process which might lead to the residual lumps of zinc metal. The structures remaining on the zinc surface after stripping can also be contaminants (non-zinc residues) from the production of the zinc foil cycled here. Because cycling under practical battery conditions requires both stripping and deposition, the stripped surface should be of equal importance. Here, it shows that a rough surface is developed—with many added nucleation sites—after the very first "cycle". FIG. 2*c* shows the surface after a single deposition, without prior stripping. Very thin platelets appear with a whisker-like morphology. In a battery, cell failure is a result of the volumetric growth outwards from the originally smooth surfaces of the two zinc electrodes due to selective pitting during stripping and platelet growth during deposition.

Figure 3:
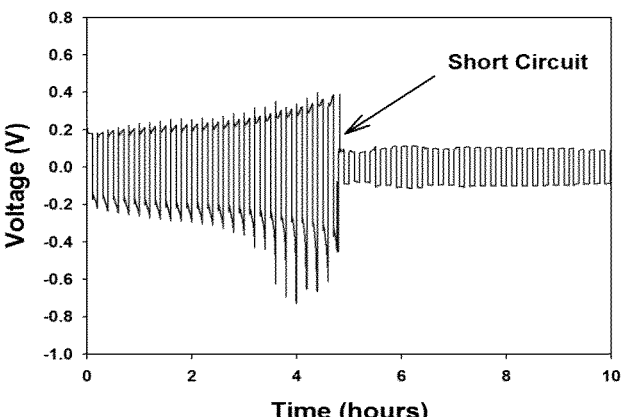
FIG. 3 shows galvanostatic cycling of a zinc//1 M $ZnSO_4$//zinc symmetric cell at a current density of 10 $mA/cm^2$ with a cut-off capacity limitation of 1 mAh (6 min. discharge and 6 min. charge). The cell lasted for 25 cycles under these conditions when an o-ring was used in place of a separator.

FIG. 3 displays the voltage-time plot for a symmetric cell consisting of two zinc electrodes separated by a rubber o-ring. The base electrolyte of 1 M ZnSO$_4$ dissolved in water was used in this example. An accelerated lifetime test was performed where the ultra-high current density of 10 mA/cm² was applied with a discharge/charge cut-off capacity of 1 mAh/cm². Under these conditions, the cell short-circuited after approximately 5 hours. The signature of a short circuit is a sudden decrease in voltage.

Figure 4:
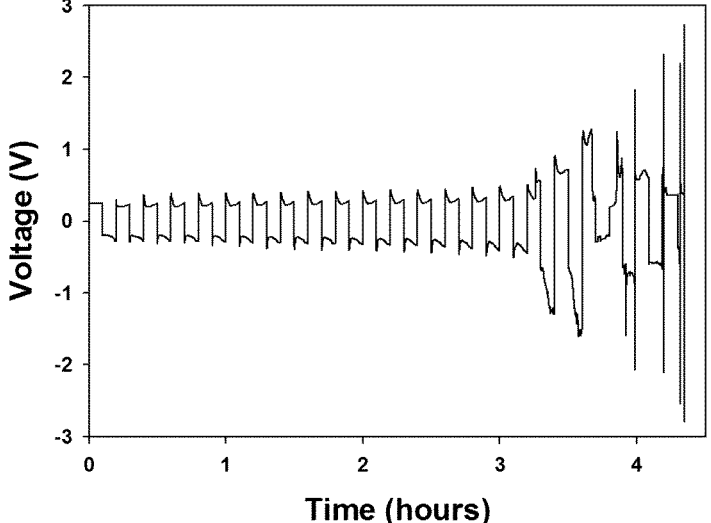
FIG. 4 shows an example voltage-time plot for a Zn||Zn symmetric cell, showing the increased voltage polarization used to determine the cycle life of these cells. This example cell was cycled at 10 mA/cm$^2$ to 1 mAh/cm$^2$ in 1 M ZnSO$_4$+1 wt. % PVP. The number of cycles obtained before the cell failed was 18.

Additives to the base electrolyte were tested. Many were found to decrease the cycle life rather than increase it with a different mechanism than internal short-circuiting. FIG. 4 shows an example with polyvinylpyrrolidone (PVP) as an additive in a concentration of 1 wt. %. Rather than a sudden decrease in voltage related to the direct transfer of current internally through a short from one zinc electrode to the other (as in FIG. 3), in the case of PVP, the polarization (voltage) actually increases due to an increase in cell impedance. This is believed to be the result of the decomposition of PVP at the zinc metal electrodes causing a resistive interface with the electrolyte and increased charge transfer resistance. This suggests that, unlike protecting negative electrodes for Li-ion batteries, a so-called solid electrolyte interphase (SEI) is undesireable for zinc metal and it is undesireable for additives to decompose on the electrode surface or be consumed during cycling.

Figure 5:
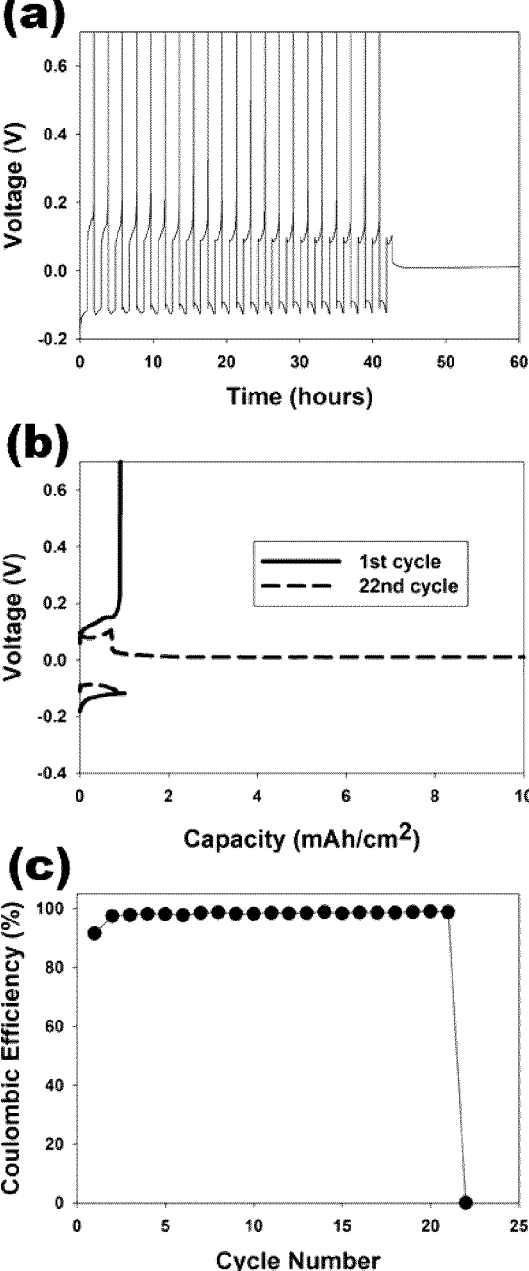
FIG. 5 shows galvanostatic cycling of a Zn∥Ti cell with an electrolyte consisting of 2 M ZnSO$_4$+0.1 M (NH$_4$)$_2$SO$_4$+100 ppm furfural. Plating of zinc onto the Ti plate was conducted at a current density of 1 mA/cm$^2$ with a cut-off capacity limitation of 1 mAh/cm$^2$. Stripping of zinc from the Ti plate was conducted at a current density of 1 mA/cm$^2$ to an upper voltage cut-off of 0.7 V. The voltage vs. time plot is displayed in (a) and the voltage vs. capacity plots are (b) for the first and last cycles. The signature of a short-circuit can be observed in (b) from the over-charge during the stripping process. The CE calculated for each plating/stripping cycle is displayed in (c).

In addition to Zn‖Zn symmetric cells, Zn‖Ti cells were also used to test the cycle life of zinc metal in different electrolytes and determine the coulombic efficiency (CE). An example of the cycling a Zn‖Ti cell is displayed in FIG. 5. A single cycle consists of plating zinc metal onto a titanium substrate to a fixed capacity (1 mAh/cm²) at 1 mA/cm² and then stripping the zinc from the titanium to a voltage cut-off of 0.7 V at 1 mA/cm². FIG. 5a shows the voltage-time plot for a cell with an electrolyte consisting of 2 M ZnSO₄+0.1 M (NH₄)₂SO₄+100 ppm furfural in water. With Zn‖Ti cells, short circuits are easy to identify, when the stripping capacity exceeds the plating capacity (1 mAh/cm²). This can be seen at the end of cycling in FIG. 5a and more clearly in FIG. 5b. There is also a sudden decrease in voltage to near 0 V when a short circuit occurs, related to the direct transfer of current internally through a short from one zinc electrode to the other. FIG. 5c shows the calculated CE for each cycle before the cell shorted. The CE is calculated per cycle according the equation $CE=Q_s/Q_p$ where $Q_s$ is the stripping capacity and $Q_p$ is the plating capacity (1 mAh/cm²). After the first cycle, the CE is >98% until cell failure.

During charge of a battery at the negative electrode, the desired zinc deposition reaction is shown below in reactions 1 and 2/3, depending on the pH. In the acidic pH range (pH<7, reaction 1), the oxidation (dissolution) product is soluble $Zn^{2+}$. In alkaline electrolytes (pH>7, reactions 2 and 3), $Zn^{2+}$ precipitates in the form of insulating ZnO. The zincate ion ($Zn(OH)_4^{2-}$) is slightly soluble in high concentrations of hydroxide ($OH^-$) and is in equilibrium with ZnO. This dissolution/precipitation mechanism in alkaline electrolytes leads to passivation of active zinc metal in the electrode, decreasing the CE and exacerbating dendrite growth. The simple mechanism in acidic electrolytes is preferred for reversibility of the zinc electrode and high CE. High CE is important for long-term cycling of batteries with a low excess of zinc metal. Inactive zinc (low CE) results in the need to use a large excess of zinc metal in order to ensure that there is enough active zinc to be cycled. The hydrogen evolution reaction (HER) is competitive to zinc deposition during charge and is also pH dependent (see reactions 4 and 5 below) and catalytic in nature, the precise potential at which they occur is sensitive to the electrolyte composition and electrode or current collector material. HER is more severe at low pH than high pH according to reactions 4 and 5 and this can also lead to lower CE.

Cathodic Reactions:

Zinc Deposition:

$$Zn^{2+}+2e^-\rightarrow Zn \quad E°=-0.76V \text{ vs. SHE} \tag{1}$$

$$Zn(OH)_4^{2-}+2e^-\rightarrow Zn+4OH^- \tag{2}$$

$$ZnO+H_2O+2OH^-\leftrightarrow Zn(OH)_4^{2-} \tag{3}$$

Hydrogen Evolution Reaction (HER):

$$2H^++2e^-\rightarrow H_2 \quad E°=0.00V \text{ vs. SHE} \tag{4}$$

$$2H_2O+2e^-\rightarrow H_2+2OH^- \quad E°=0.00V \text{ vs. SHE} \tag{5}$$

Figure 6:
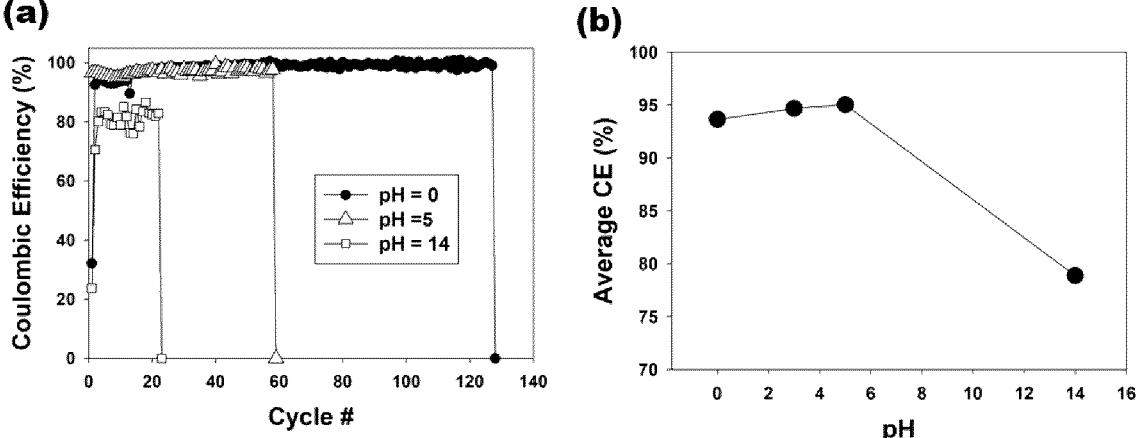
FIG. 6 displays a study of pH on zinc plating/stripping using Zn∥Ti cells. The cells were cycled at a current density of 1 mA/cm$^2$. Plating was conducted to a capacity cut-off of 1 mAh/cm$^2$ and stripping was conducted to an upper voltage cut-off of 0.7 V. The electrolytes used were 1 M H$_2$SO$_4$+1 M ZnSO$_4$ (pH=0), 0.1 M H$_2$SO$_4$+1 M ZnSO$_4$ (pH=3), 1 M ZnSO$_4$ (pH=5), and 6 M KOH saturated with ZnO (pH=14). The last cycle shown in (a) was determined when the stripping capacity exceeded the plating capacity (i.e. a short-circuit occurred). The average CE values plotted in (b) were calculated for cycles 5-15.

The pH dependence on the reversibility of the zinc electrode was examined using Zn‖Ti cells. Zinc metal was deposited onto the Ti electrode substrate at 1 mA/cm² to a capacity of 1 mAh/cm², then stripped to an upper voltage cut-off of 0.7 V. The electrolytes examined were [1 M ZnSO₄+1 M H₂SO₄] in water (acidic, pH=0), [1 M ZnSO₄+0.1 M H₂SO₄] in water (acidic, pH=3), 1 M ZnSO₄ in water (slightly acidic, pH=5), and [6 M KOH saturated with ZnO] in water (alkaline, pH=14). FIG. 6a shows the CE for each cycle for pH 0, 5, and 14 electrolytes until the cells shorted. The cell with the most acidic electrolyte (pH=0) lasted the longest, followed by the slightly acidic electrolyte (pH=5), and the alkaline electrolyte (pH=14) only lasted about 20 cycles. The short cycle life and much lower CE (~80%) with the alkaline electrolyte is presumed to be due to passivation of the electrode by ZnO and severe dendrite growth. As shown in FIG. 6b, the average CE for cycles 5-15, is slightly lower for the strongly acidic electrolyte. This is because of increased HER at the low pH. The highest CE and non-corrosive nature of the near-neutral pH electrolyte (pH=5) is preferred.

Figure 7:
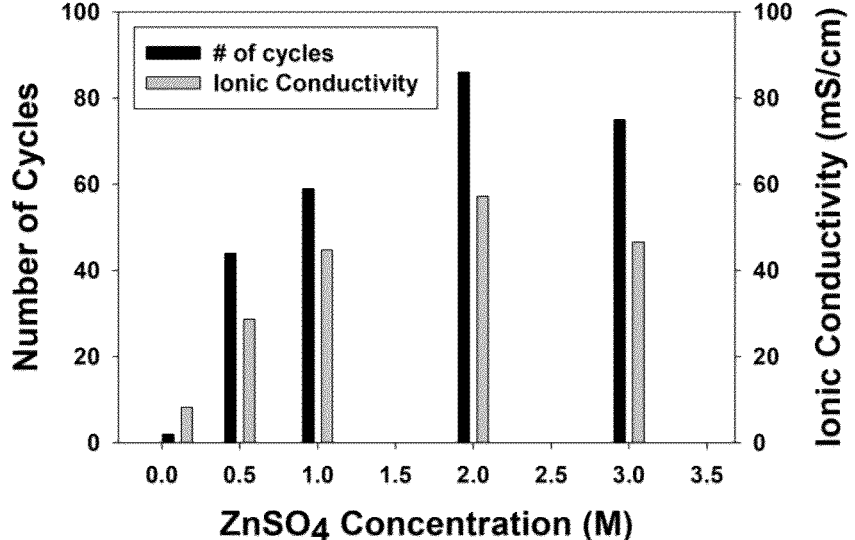
FIG. 7 shows the effect of concentration of ZnSO$_4$ on the ionic conductivity and number of cycles achieved in Zn∥Ti cells. The series of ZnSO$_4$ electrolytes were prepared by dissolving pure ZnSO$_4$ in water without any additional components. The cells were cycled at a current density of 1 mA/cm$^2$. Plating was conducted to a capacity cut-off of 1 mAh/cm$^2$ and stripping was conducted to an upper voltage cut-off of 0.7 V. All cells were cycled at room temperature and the ionic conductivities were also measured at room temperature (22±3° C.). The number of cycles was determined by the signature of a short-circuit.

Moving forward with the preferred pH electrolyte containing only ZnSO₄, different concentrations of the sulfate salt were tested (FIG. 7). A direct correlation was observed between the number of cycles achieved in Zn‖Ti cells and the ionic conductivity of the electrolytes. It was found that of the concentrations tested, 2 M ZnSO₄ had the highest ionic conductivity (57.1 mS/cm) and lasted for 86 cycles before shorting occured. This study of ZnSO₄ concentration is also displayed as example 1 in Table 1 below. Table 1 shows electrolyte compositions and the number of cycles acheived before short circuits occured in Zn‖Ti cycled at 1 mA/cm² to 1 mAh/cm² deposition capacity and a 0.7 V stripping cut-off.

TABLE 1

| Comparative examples of electrolyte compositions. | | | | | |
|---|---|---|---|---|---|
| | Electrolyte Composition | | | | |
| Example | Component 1 | Component 2 | Component 3 | Component 4 | Number of Cycles |
| 1 | 0.1M ZnSO₄ | | | | 2 |
| | 0.5M ZnSO₄ | | | | 44 |

TABLE 1-continued

| | Comparative examples of electrolyte compositions. | | | | |
|---|---|---|---|---|---|
| | Electrolyte Composition | | | | |
| Example | Component 1 | Component 2 | Component 3 | Component 4 | Number of Cycles |
| | 1M $ZnSO_4$ | | | | 59 |
| | 2M $ZnSO_4$ | | | | 86 |
| | 3M $ZnSO_4$ | | | | 75 |
| 2 | 1M $ZnSO_4$ | | | | 59 |
| | 1M $ZnSO_4$ | 0.1M $(NH_4)_2SO_4$ | | | 93 |
| 3 | 1M $ZnSO_4$ | | | | 59 |
| | 1M $ZnSO_4$ | | | 10 vol. % ethylene glycol | 82 |
| | 1M $ZnSO_4$ | | 0.15M $H_3BO_3$ | 10 vol. % ethylene glycol | 351 |
| 4 | 1M $ZnSO_4$ | | | | 59 |
| | 1M $ZnSO_4$ | | | 5 g/L nicotinamide | 121 |
| | 1M $ZnSO_4$ | | | 100 ppm SDS | 70 |
| | 1M $ZnSO_4$ | | | 100 ppm CTAB | 13 |
| | 1M $ZnSO_4$ | | | 500 ppm furfural | 37 |
| | 1M $ZnSO_4$ | | | 500 ppm ethylvanillin | 126 |

Rather than relying only on the base salt of $ZnSO_4$ to reach maximum ionic conductivity, additional salts can be added. In example 2, a small amount of ammonium sulfate (0.1 M) to 1 M $ZnSO_4$ increased the ionic conductivity from 44.8 mS/cm for 1 M $ZnSO_4$ only to 57.1 mS/cm. This increase in ionic conductivity led to an increase in the number of cycles achieved in Zn‖Ti cells from 59 to 93.

In example 3, the effect of a buffering agent (boric acid) and a brightener (ethylene glycol) were examined. When 90 vol. % water and 10 vol. % ethylene glycol was used as the solvent for 1 M $ZnSO_4$ instead of pure water, the number of cycles increased to 82. When using $H_3BO_3$ in addition to ethylene glycol, the number of cycles was increased to 351. This suggests that ethylene glycol breaks down during cycling and changes the pH. The buffer agent can prevent the detrimental pH change.

Other brighteners for sulfate plating baths were tested as control additives in example 4. Nicotinamide, SDS, and ethylvanillin all improved the cycling performance of the cells. However, it can be seen that not all of these compounds increased the cycle life. Some (CTAB and furfural) were actually detrimental and decreased the number of cycles (similar to PVP in FIG. 4). This shows that brighteners used for plating baths will not neccessarily work to smooth deposits in rechargeable zinc metal batteries. Combinations of additives which have different roles (example 3) seem to work the best.

Figure 8:
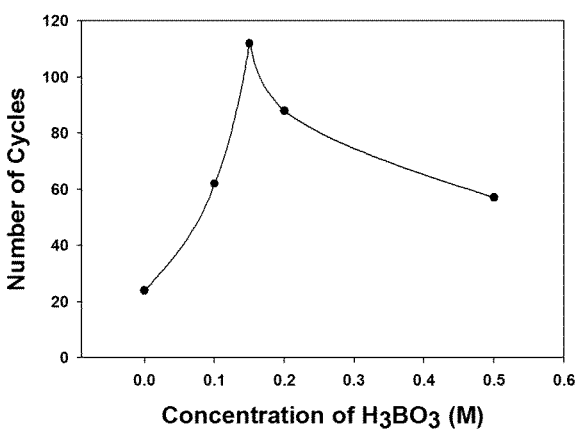
FIG. 8 shows the effect of various additives to 1 M ZnSO$_4$/H$_2$O electrolyte on the cycle life of Zn∥Zn symmetric cells. The cells were cycled at 10 mA/cm$^2$ to 1 mAh/cm$^2$. The number of cycles was determined as the point in the voltage-time plots when the voltage decreased instantaneously (indicating an internal short-circuit).
Figure 8:
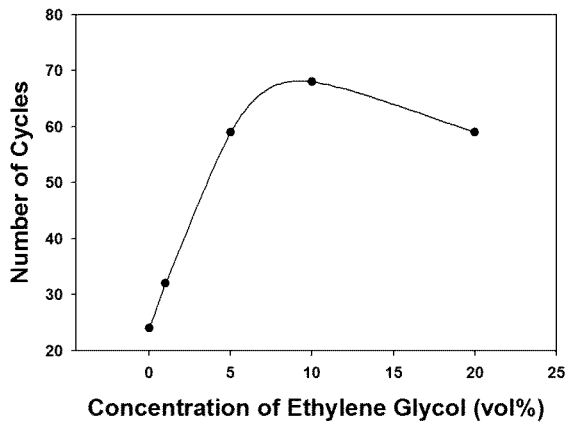
Figure 8:
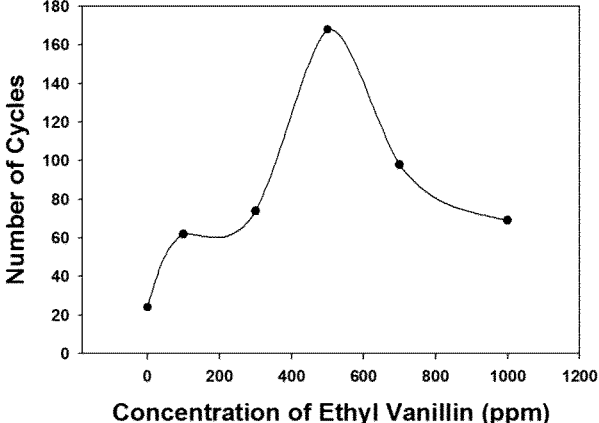
Figure 9:
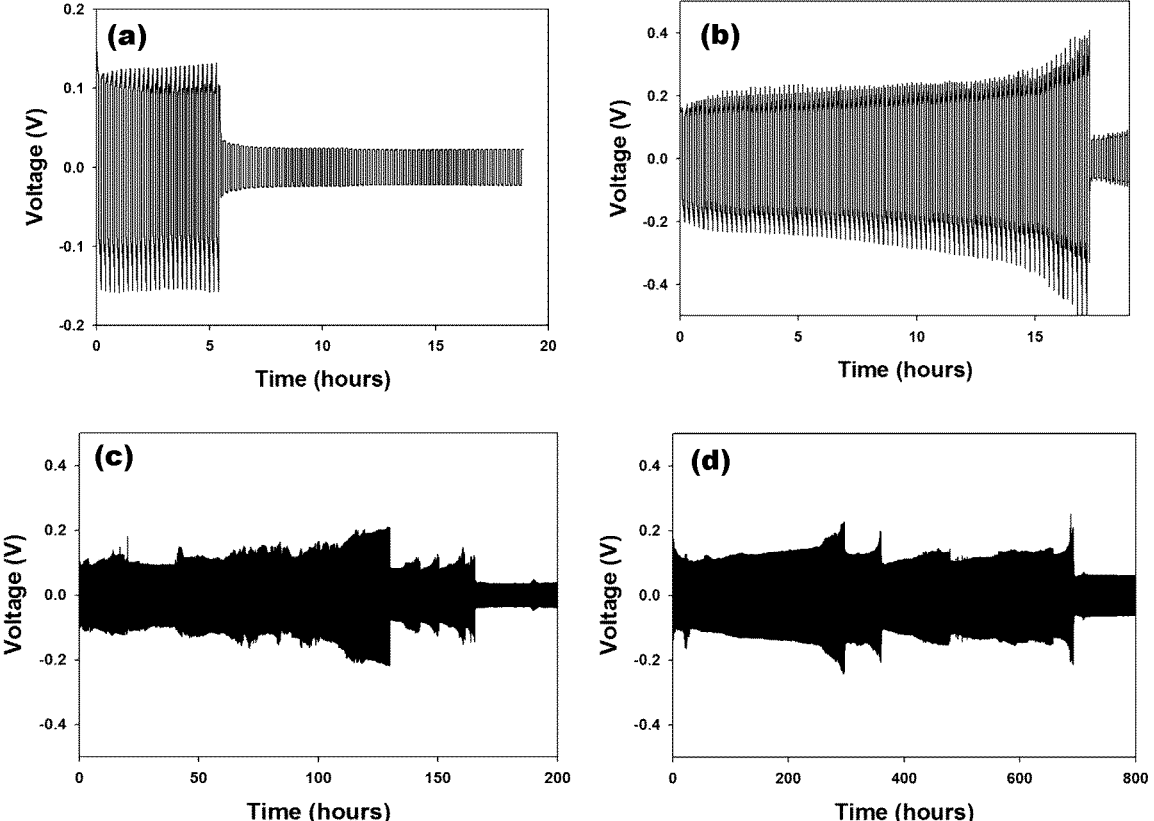
FIG. 9 shows voltage-time plots for Zn∥Zn symmetric cells cycled at 50 mA/cm$^2$ to 5 mAh/cm$^2$ in: (a) 1 M ZnSO$_4$; (b) 1 M ZnSO$_4$/H$_2$O+0.2 M boric acid; (c) 1 M ZnSO$_4$+0.15 M boric acid+500 ppm ethyl vannilin in ethylene glycol:water (10:90 vol. %); and (d) 1 M ZnSO$_4$+0.15 M boric acid in ethylene glycol:water (10:90 vol. %).
Figure 10:
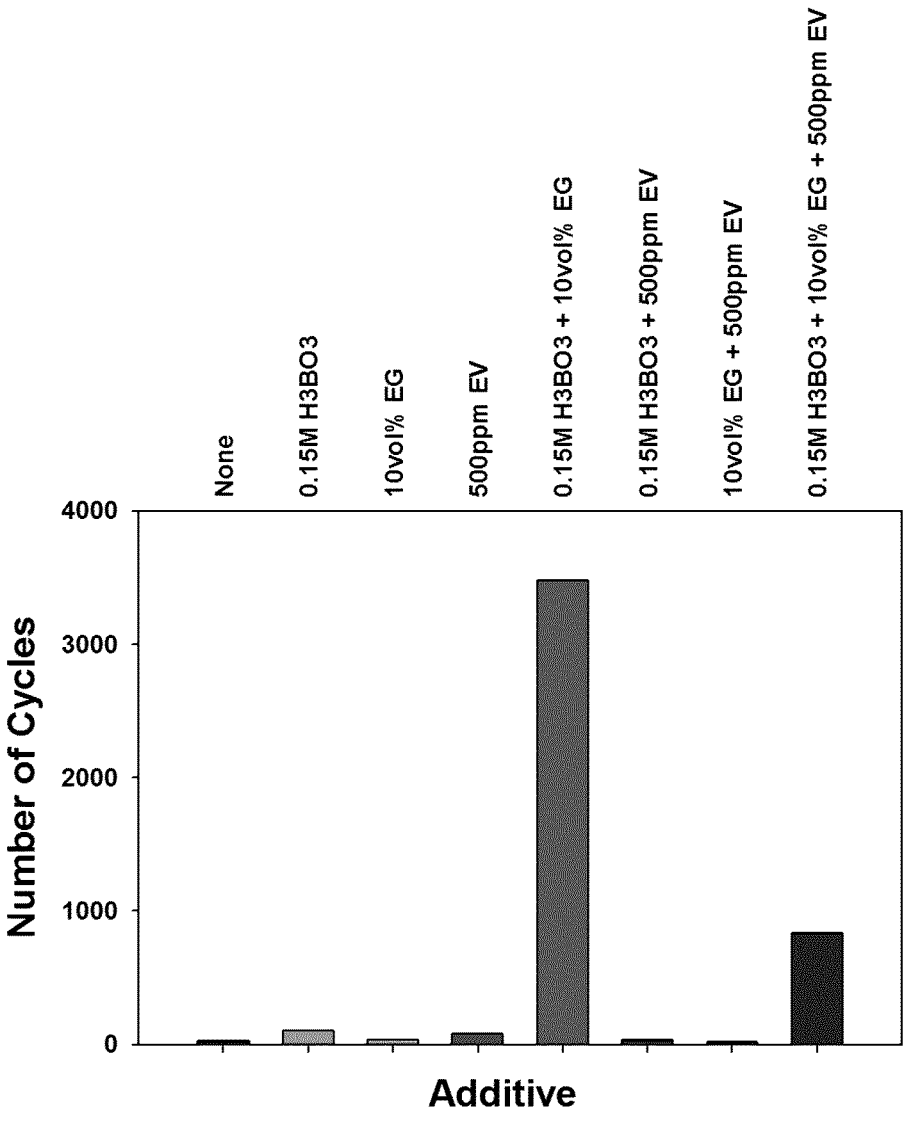
FIG. 10 shows a bar graph showing the number of cycles before short circuiting occurred for Zn∥Zn symmetric cells cycled at 50 mA/cm$^2$ to 5 mAh/cm$^2$ in various electrolytes.

More examples of selected beneficial additives which can extend the cycle life of the 1 M $ZnSO_4$/$H_2O$ electrolyte are shown in FIG. 8. The effective concentration range of boric acid ($H_3BO_3$), ethylene glycol, and ethyl vanillin additives in the electrolyte was analyzed for Zn‖Zn symmetric cells. The voltage-time plots for selected concentrations and combinations of these additives are shown in FIG. 9. Any one of these additives were shown to increase the cycle life of the zinc metal electrode significantly. A bar graph to summarize the number of cycles of the Zn‖Zn symmetric cells before short circuits occured is displayed in FIG. 10. The best performance (most cycles achieved) was for an electrolyte with the composition [1 M $ZnSO_4$+0.15 M $H_3BO_3$] in a mixture of ethylene glycol (10 vol. %) and water. The cell with this electrolyte cycled at 50 mA/cm$^2$ to 5 mAh/cm$^2$ lasted for 3475 cycles, compared to the base electrolyte (1 M $ZnSO_4$/$H_2O$) which only lasted for 25 cycles.

In summary, electrolyte formulas were examined for batteries using zinc metal negative electrodes. The Coulombic efficiency of zinc plating/stripping can be highest and the cycling can be most stable for electrolytes which have a near neutral pH. In electrolytes with a near neutral pH, the zinc metal electrode undergoes morphology changes and volumetric expansion after repeated cycling which can lead to internal short-circuits of battery cells. The likelihood of cell failure by internal short circuits was examined using accelerated lifetime tests of Zn‖Zn symmetric cells at high current densities (10 mA/cm$^2$ or 50 mA/cm$^2$) and/or high cycling capacities (5 mAh/cm$^2$) and also using Zn‖Ti cells by plating zinc onto a Ti and subsequently stripping it from the Ti. Additives to $ZnSO_4$/$H_2O$ electrolytes which increase the ionic conductivity and/or buffer the pH and/or act as brighteners to smooth the zinc surface were found to be effective in extending the number of cycles before internal short-circuits occurred.

The following paragraphs describe the experimental methods used herein.

The morphologies of the zinc electrodes were examined by field-emission scanning electron microscopy (FE-SEM, LEO 1530).

The cycling behavior of Zn‖Zn symmetric cells were investigated in PFA based Swagelok® type cell using titanium rods as the current collectors. For all cells, two pieces of glass fiber membranes (Millipore, AP-40, 475 μm thick) were used as the separator. Zinc foil (250 μm thick, 99%, McMaster Carr) was punched into 1 cm$^2$ disks and served as the zinc electrodes for the symmetric cells. Galvanostatic cycling studies were performed using multichannel biologic VMP3 potentiostat/galvanostat at room temperature (22±3° C.).

Test cells of Zn‖Ti format were constructed from titanium plates sandwiched between acrylic plates with a rubber gasket for sealing. For all cells, one piece of glass fiber membrane (Whatman glass microfiber filter) was used as the separator. Zinc foil (250 μm thick, 99%, McMaster Carr) was cut into 5.5 cm×5.5 cm squares (30.25 cm$^2$) and served as the negative electrodes. A square plate of Ti (McMaster Carr) cut to 4 cm×4 cm (16 cm$^2$) served as the positive electrode substrate for zinc deposition and dissolution. Zinc was deposited onto the Ti plate at 1 mA/cm$^2$ to a capacity of 1 mAh/cm$^2$, then it was stripped to an upper voltage cut-off of 0.7 V. The coulombic efficiency (CE) was calculated as the charge passed for stripping over the charge passed for deposition (1 mAh/cm$^2$). Galvanostatic cycling studies were performed using Landt battery testing station (CT2001A) at room temperature (22±3° C.).

The standard electrolyte consisted of 1 M ZnSO$_4$ (in the form of ZnSO$_4$·7H$_2$O) dissolved in deionized water. All chemicals were purchased from Sigma-Aldrich and used as received. The various additives tested were boric acid (H$_3$BO$_3$), ethylene glycol, ethyl vanillin, polyvinylpyrrolidone (PVP, Avg. M$_n$=8000 g/mol), Pluronic P-123 surfactant, polyethylene glycol (PEG-4600, Avg. M$_n$=4600 g/mol), polyethylene glycol (PEG-600, Avg. M$_n$=600 g/mol), potassium pyrophosphate (K$_2$P$_4$O$_7$), Triton X-100 surfactant, 2-chlorobenzaldehyde, dodecylamine, tetrabutylammonium sulfate, jeffamine M-600, jeffamine ED-600, glycine, thiourea, polyvinylalcohol (PVA), polyethyleneimine (PEI), zinc citrate, dextrin, cetyltrimethylammonium bromide (CTAB), sodium dodecyl sulfate (SDS), nicotinamide, ammonium sulfate ((NH$_4$)$_2$SO$_4$), and furfural. The additives were dissolved in the 1 M ZnSO$_4$ electrolyte in various quantities.

For the pH studies, potassium hydroxide (KOH), zinc oxide (ZnO), and sulfuric acid (H$_2$SO$_4$) were purchased from Sigma-Aldrich and used to prepare the electrolytes in addition to ZnSO$_4$·7H$_2$O. The pH was roughly measured with pH paper only.

Ionic conductivities were measured using an Oakton PC 700 conductivity meter.

While the above description provides examples of one or more apparatuses or methods, it will be appreciated that other apparatuses or methods may be within the scope of the accompanying claims.

I claim:

1. A rechargeable zinc battery in a stacked configuration, comprising:
   a positive electrode;
   a negative electrode comprising zinc; and
   an electrolyte for transferring Zn$^{2+}$ ions between the negative electrode and the positive electrode, the electrolyte comprising:
     zinc sulfate dissolved in water with a pH in the range of 0-7; and
     at least one first additive comprising boric acid for buffering the pH of the electrolyte; and
     at least one second additive comprising one or more of ethylene glycol, nicotinamide, sodium dodecyl sulphate, and ethylvanillin for smoothing a stripped/plated surface of the negative electrode;
   wherein, during normal operation, zinc ions are products or reactants of electrochemical reactions at each electrode, wherein the electrochemical reactions account for the majority of charge transferred at each electrode, and wherein the rechargeable zinc battery is selected from the group consisting of a zinc-ion battery, a zinc hybrid supercapacitor, a zinc-bromide battery, a zinc-iodide battery, a zinc-iron redox flow battery, and a zinc-cerium redox flow battery.

2. The apparatus of claim 1, wherein the at least one first additive is present in the electrolyte in a range from about 0.005 M to about 6 M.

3. The apparatus of claim 1, wherein the at least one second additive is present in the electrolyte in a range from about 10 ppm to about 50 percent.

4. The apparatus of claim 1, wherein the zinc sulfate is dissolved so that the Zn$^{2+}$ ions are present in the electrolyte in a range from about 0.05 M to about 4 M.

5. The apparatus of claim 1, wherein the pH of the electrolyte is between about 4 and about 6.

6. The apparatus of claim 1, wherein the negative electrode is formed substantially of any one of a zinc metal and a zinc alloy.

7. The apparatus of claim 1, wherein the negative electrode comprises a current collector, wherein the current collector is formed substantially of a material selected from the group consisting of carbon, boron, lead, vanadium, chromium, manganese, iron, cobalt, nickel, cadmium, tungsten, bismuth, tin, indium, antimony, copper, titanium, zinc metal, and any combination thereof.

8. The apparatus of claim 1, wherein the rechargeable battery is an aqueous rechargeable battery.

9. An aqueous electrolyte configured for use with a rechargeable zinc battery in a stacked configuration comprising a positive electrode, a negative electrode, the aqueous electrolyte being disposed therebetween, the aqueous electrolyte comprising:
   zinc sulfate dissolved in water with a pH in the range of 0-7; and
   at least one first additive comprising boric acid for buffering the pH of the electrolyte; and
   at least one second additive comprising one or more of ethylene glycol, nicotinamide, sodium dodecyl sulphate, and ethylvanillin for smoothing a stripped/plated surface of a negative electrode of the rechargeable battery;
   wherein, during normal operation, zinc ions are products or reactants of electrochemical reactions at each electrode of the rechargeable battery, wherein the electrochemical reactions account for the majority of charge transferred at each electrode, and wherein the rechargeable zinc battery is selected from the group consisting of a zinc-ion battery, a zinc hybrid supercapacitor, a zinc-bromide battery, a zinc-iodide battery, a zinc-iron redox flow battery, and a zinc-cerium redox flow battery.

10. The electrolyte of claim 9, wherein the first additive is present in the electrolyte in a range from about 0.005 M to about 6 M.

11. The electrolyte of claim 9, wherein the second additive is present in the electrolyte in a range from about 10 ppm to about 50 percent.

12. The electrolyte of claim 9, wherein the zinc sulfate is dissolved so that the Zn$^{2+}$ ions are present in the electrolyte in a range from about 0.05 M to about 4 M.

13. The electrolyte of claim 9, wherein the pH of the electrolyte is between about 4 and about 6.

14. The electrolyte of claim 9, wherein the second additive is a brightener used in electroplating processes.

15. The rechargeable battery of claim 1, wherein the second additive is a brightener used in electroplating processes.

* * * * *